United States Patent [19]
Hamilton et al.

[11] 3,879,647
[45] Apr. 22, 1975

[54] DC TO DC CONVERTER WITH REGULATION HAVING ACCELERATED SOFT START INTO ACTIVE CONTROL REGION OF REGULATION AND FAST RESPONSE OVERCURRENT LIMITING FEATURES

[75] Inventors: Billy Harold Hamilton, Summit; Frank Carl La Porta, Millington; Robert Edward Schroeder, Parsippany, all of N.J.

[73] Assignee: Bell Telephone Laboratories, Incorporated, Murray Hill, N.J.

[22] Filed: June 7, 1974

[21] Appl. No.: 477,212

[52] U.S. Cl. .................. 321/2; 321/14; 321/45 S
[51] Int. Cl. .............................................. H02m 3/32
[58] Field of Search .................. 321/2, 14, 16, 45 S; 323/DIG. 1; 317/13 A

[56] References Cited
UNITED STATES PATENTS

| | | | |
|---|---|---|---|
| 3,467,848 | 9/1969 | Ainsworth | 321/14 |
| 3,585,491 | 6/1971 | Petersen | 321/2 |
| 3,676,768 | 7/1972 | Morrey | 321/2 |
| 3,769,568 | 10/1973 | Hamilton et al. | 321/2 |
| 3,843,919 | 10/1974 | Yamamura et al. | 321/2 |

*Primary Examiner*—William H. Beha, Jr.
*Attorney, Agent, or Firm*—A. G. Steinmetz

[57] ABSTRACT

A power supply includes a signal adjustment system to control the rate of turnon and turnoff of the signal output. The power supply comprises a switching type regulator which operates with an initial dead time period in each cycle. The signal adjustment system has a variable rate of signal change to speed up the transition through the dead time periods.

6 Claims, 4 Drawing Figures

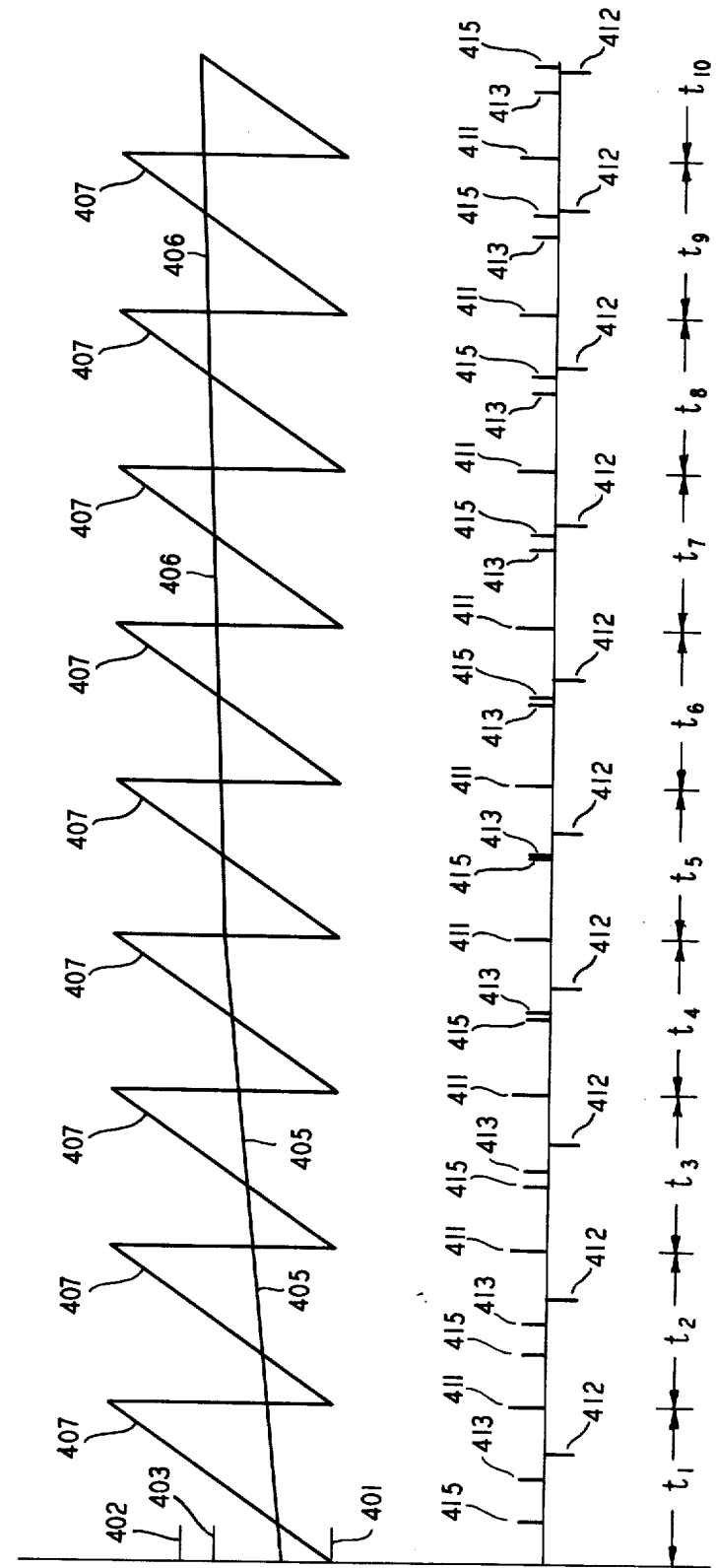

DC TO DC CONVERTER WITH REGULATION HAVING ACCELERATED SOFT START INTO ACTIVE CONTROL REGION OF REGULATION AND FAST RESPONSE OVERCURRENT LIMITING FEATURES

BACKGROUND OF THE INVENTION

This invention relates to power supplies and, in particular, to regulated pulse width modulated converter circuits. It is specifically concerned with a signal adjustment system to automatically control the raising and lowering of the signal output of the converter.

In powering reactive loads, such as a capacitive transmission cable, an abrupt change in the output signal level of the power supply such as experienced during turnon produces significant transient currents. In order to reduce these transients, it is desirable that the output signal of the power supply applied to the load be changed very slowly. One method of controlling such a slow signal change is by use of a manually controlled rheostat with which an operator attenuates the signal. The rheostat is manually adjusted after turnon to slowly increase the output signal by reducing the attenuation. Every time the output signal is raised and lowered, however, there is a danger of mistakes being made in the manual adjustment which may result in damage to the power supply or the system being energized.

An automatic signal adjustment system to raise and lower the signal output is more desirable inasmuch as it eliminates the probability of a human error in a manual adjustment. A power supply system including an automatic signal adjustment system to raise and lower the signal is disclosed in U.S. Pat. No. 3,769,568, issued to B. H. Hamilton et al on Oct. 30, 1973 and assigned to the same assignee as this application. The DC to DC converter disclosed therein employs digital type feedback control techniques in which feedback control pulses are generated with a time delay relative to a synchronizing signal pulse. The time delay of each pulse is responsive to a particular individual output parameter. The feedback control circuit of the converter responds only to the first arriving feedback pulse. A soft start signal adjustment system injects additional soft-start pulses into the feedback system to limit the output signal during the startup of the converter. These soft-start pulses are generated with a time delay that increases slightly with each successive cycle of operation after the start of the converter. During startup of the converter the soft-start pulse is the first pulse to arrive at the feedback control circuit and limits the output signal to a very low value. The time delay of the soft-start pulse is gradually increased during each successive cycle of operation until the output signal of the converter attains its regulated value.

It is desirable that converter circuits be protected against short circuits and overloads since the high current drawn by these short circuits may damage the power supply itself. By monitoring the output current, an increase in the output current beyond a certain threshold may be utilized to generate a signal to operate a shutdown circuit to shut the converter off. This protection arrangement has the disadvantage that starting circuitry must be included to restart the converter circuit. Also if the short circuit is intermittent, the converter may shut down and start up again and again, or it may become inoperative for a substantial time period.

An alternative method of achieving the short-circuit protection in a pulse width modulated converter circuit is to respond to a current overload by reducing the duty cycle of the converter switching devices to a very small value. Such a scheme is disclosed in U.S. Pat. No. 3,701,137, issued to D. E. Combs on Oct. 31, 1972, and assigned to the same assignee as this application. The pulse width modulation control converter disclosed in the Combs patent includes a pulse width control circuit to drive the switching devices of the converter. The timing range of the pulse width control circuit permits the reduction of the conduction period of the switching devices to a zero percent duty cycle. The pulse width control circuit includes a time delay circuit which initially inhibits for a fixed duration of time the pulse output of the pulse width control circuit driving the converter switching devices. Hence control pulses of very short duration are generated in response to a short circuit or an overload and temporarily permit the converter to operate with a zero percent duty cycle. This effectively protects against short circuits, whether they be continuous or intermittent, and eliminates the necessity to restart the converter circuit when the short circuit is removed.

Both of the above features are highly desirable in converter circuits. However, combining the slow turnon and slow turndown of soft start and the zero percent duty cycle control creates problems due to the initial dead time duty cycle control. Long delays occur while the slowly varying control signal of the signal adjustment system goes through the initial fixed duration of time and eventually brings the converter into its active regulation region during turnon and turnoff.

It is therefore an object of the invention to eliminate long delays outside the active regulation region in automatic signal adjustment soft-start controls in a pulse width modulated converter.

It is also an object of the invention to digitally control automatic signal adjustment soft-start controls without the necessity of analog signal comparisons in the control circuitry.

SUMMARY OF THE INVENTION

Therefore, in accordance with the invention, a pulse width controlled converter has an automatic signal adjustment soft-start arrangement utilizing digital circuit techniques. The regulation of the converter is controlled by a priority of feedback pulse techniques. The turnup and turndown or soft start is accomplished by utilizing a ramp pulse to slowly increase or decrease the width of the regulated pulses driving the switching devices of the converter. During turnon the time delay of the ramp pulse increases until it equals the time delay of the regulation pulse controlling the regulated output signal. The turnon ramp pulse initially acts as the first priority feedback pulse to limit the output of the converter.

Prior to achieving the regulated output the ramp pulse is generated in response to a comparison of a sawtooth voltage waveform synchronized by the clock of the converter and a slowly increasing voltage ramp. These two signals are applied to a comparator and the output of the comparator is differentiated. This causes the generation of a ramp pulse whose time delay relative to the synchronizing trigger pulse increases slowly during each successive cycle.

The converter is designed to operate at a zero percent duty cycle. The converter has an active region after an initial time delay established by a starting pulse during which output pulse signals are generated in each half cycle. During the initial time delay, the generation of output pulse signals by the converter is inhibited. In order to avoid long delays while the time delay of the controlling ramp pulse is increasing or decreasing outside the active region during turnup or turndown, a fast slew control circuit is utilized to increase the speed at which the ramp pulse traverses the region outside the active region.

The fast slew control circuit includes a pulse sequence detector which compares the time delay of the ramp pulse relative to the time delay of the starting pulse and the time delay of other feedback pulses. During the interval when the ramp pulse has the shortest time delay during the initial time delay of the zero duty period, an output from the sequence detector is utilized to speed up the time constant of the charging circuits controlling the rate of change of the time delay of the ramp pulse. When the ramp pulse time delay exceeds the time delay of the starting pulse, the rate of change of the time delay of the ramp pulse is slowed down to its normal rate.

It is apparent from the foregoing that by changing the time constants of the charging circuit controlling the rate of change of the time delay of the ramp pulse, the ramp pulse can be controlled to automatically slew quickly into the active regulation region and then move slowly through the active region until the regulated signal output of the converter is attained.

The fast slew control circuit is implemented simply with digital circuits and no analog voltage comparisons are necessary to activate the automatic fast slewing operation.

A feature of the invention is that the existence of the initial time delay of the zero duty cycle permits the utilization of a simple control circuit to respond to overcurrent outputs of the converter. An overcurrent monitor is located in series with the principal filter inductor of a converter so as to sense the switching current in the high power switching transistors of the converter. The overcurrent monitor provides fast current limiting by responding to a detected overcurrent condition by energizing a pulse generator to generate a continuous stream of pulses having a very high frequency much greater than the synchronizing frequency of the pulse width controlled converter. These pulses are utilized in the priority feedback system of the converter so as to limit the duty cycle of the converter switching devices as needed to limit the current. The control range of the current limiting circuit extends down to and including a zero duty cycle.

BRIEF DESCRIPTION OF THE DRAWING

An understanding of the invention may be readily attained by reference to the detailed description hereinbelow and the drawing which it describes wherein:

FIG. 4 shows voltage waveforms to illustrate the operation of the fast slew control circuit.

DETAILED DESCRIPTION

Figure 1:
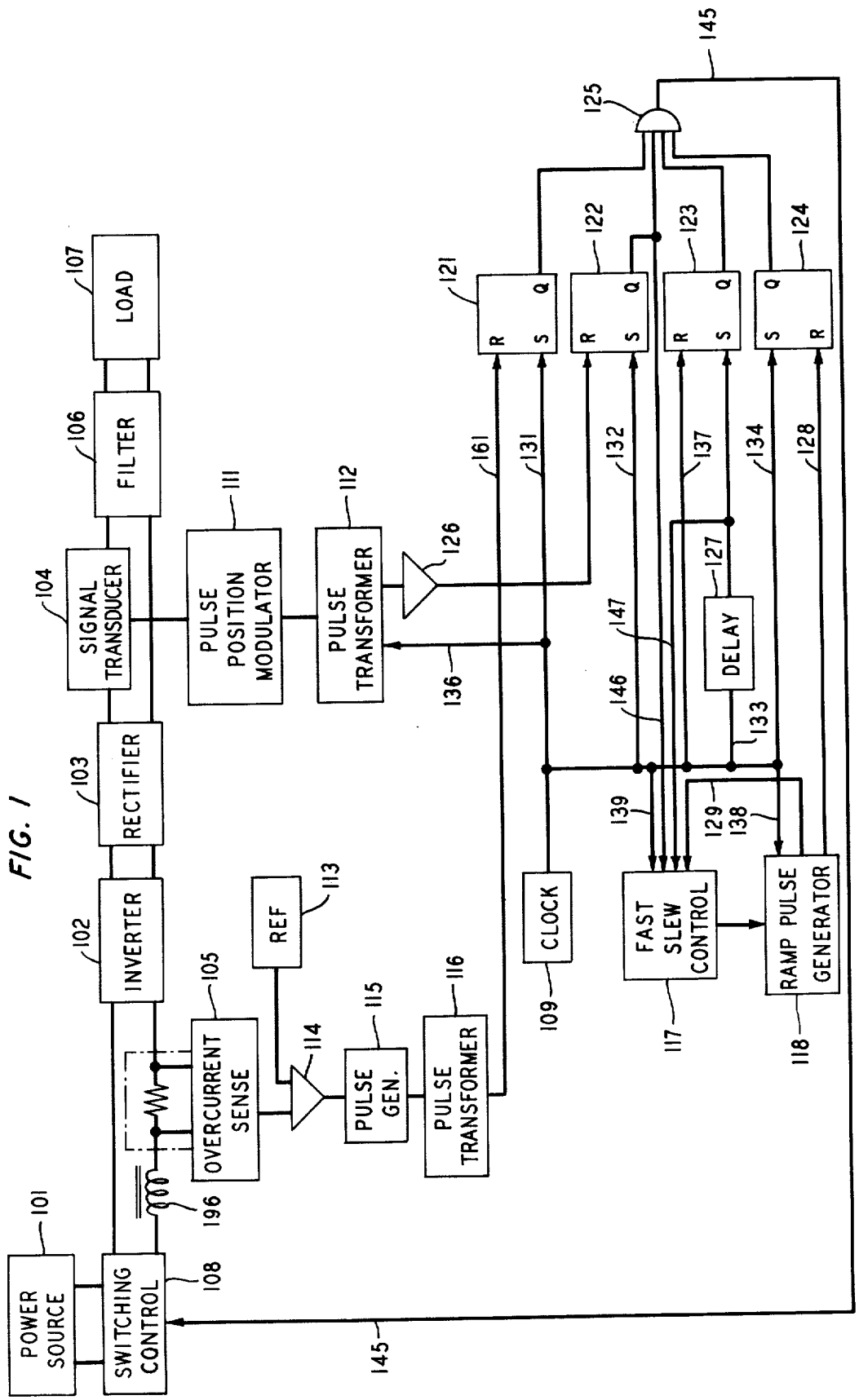
FIG. 1 is a block diagram of a DC to DC converter including soft start with fast slewing into the active region according to the invention.

A DC to DC converter having a signal adjustment system utilizing the soft-start technique with the fast slew control is illustrated in FIG. 1. The converter shown comprises a power source 101 which may be a DC battery or other source of DC energy and which is connected to a switching control 108 which regulates the power flow to an inverter 102. The inverter 102, which may be single or double ended, includes switching devices and a transformer to invert the DC output of the power source 101 as determined by switching control 108 and transform it to an AC signal. The switching control 108 may comprise a regulator circuit which regulates current flow from the power source 101 into the switching devices of the inverter 102. The output circuit of the switching control 108 includes an inductor 196 to limit rapid current changes.

The transformed output signal of the inverter 102 is applied to a full-wave rectifier 103 which converts it into a DC signal. This DC signal is coupled to a filter 106 which smooths the ripple therein. The output of the filter 106 is connected to the load 107 to be energized.

A signal transducing circuit 104 is coupled to the output of the rectifier 103 to sense an output signal parameter for the purposes of regulation. This sensed signal parameter is applied to a pulse position modulator 111 which converts the sensed analog signal to a position modulated pulse proportional to the analog signal parameter being regulated. The position modulated pulse is applied to a pulse transformer 112. The pulse transformer 112 provides isolation between the input and output of the converter circuit. A suitable pulse position modulator and pulse transformer for this application is disclosed in U.S. Pat. No. 3,769,568, issued to B. H. Hamilton et al on Oct. 30, 1973. Since a full disclosure of this circuit is made therein, a detailed discussion of the circuit is not necessary herein but can be attained by reference to the aforementioned patent.

A clock source 109 generates synchronizing pulses at a constant frequency. These synchronizing pulses are applied, via lead 136 and pulse transformer 112, to synchronize the operation of the pulse position modulator 111. The synchronizing pulses are also applied via leads 131, 132, and 134 to the set input of the bistable multivibrators 121, 122, and 124, respectively. The synchronizing pulses are also applied, via lead 137, to the reset input of the bistable multivibrator 123.

The time delayed regulating negative pulse output of the pulse transformer 112 is applied to a polarity inverter 126 which converts it to a positive pulse. This pulse is applied to the reset input of bistable multivibrator 122.

The bistable multivibrator 122 has its output set to a high state in response to the synchronizing pulse applied to it via lead 132. This high state continues until the arrival of the regulating pulse output of the inverter 126 which resets the bistable multivibrator output to its low state. The output of the bistable multivibrator 122 is a regulation pulse which is utilized to control the output signal level of the converter.

An overcurrent sensing circuit 105, which may comprise a resistance or other sensing means, is connected in series with the principal filter inductor 196 of the converter. The current flowing through the filter inductor 196 is representative of the peak switching current of the switching transistors in the inverter 102. The sensing circuit 105 applies a signal proportional to the inductor current to the comparator 114. A reference signal source 113 is coupled to the other input of the comparator 114. If the output signal of the overcurrent sensing circuit 105 exceeds the reference signal of the reference source 113, the comparator 114 generates a signal to activate the high frequency pulse generator 115. The high frequency pulse generator 115 operates at a high frequency much higher than that of the clock source 109. These high frequency pulses are coupled via the pulse transformer 116 and lead 161 to the reset input of the bistable multivibrator 121.

Since the high frequency pulse generator 115 is activated only in response to an overcurrent condition, the bistable multivibrator 121 normally remains in its set condition applying a high level signal to enable the AND gate 125. In the event of an overcurrent condition, the bistable multivibrator 121 is reset quickly before the termination of the initial dead time period established by the bistable multivibrator 123 as described below. The bistable multivibrator 121 in its reset state in response to the overcurrent condition disables AND gate 125 and temporarily reduces the switching devices of inverter 102 to a low or zero percent output level as required. This prevents a further increase in switching current and prevents damage to the switching transistors due to overcurrent conditions.

The bistable multivibrator 123 is utilized to generate an initial dead time by generating a start pulse which occurs after the synchronizing pulse. The output of the clock 109 is applied, via lead 137, to initially reset the bistable multivibrator 123. The reset output signal of multivibrator 127 disables AND gate 125 and inhibits the transmission of regulation signals to the switching control 108. The synchronizing pulse output from the clock 109 is applied, via lead 133, to a delay circuit 127 which delays it for a short fixed period of time. This delay time period is set equal to the initial dead time desired. The delayed synchronizing pulse, known as the start pulse, is utilized to set the bistable multivibrator 123. The high level signal output of the multivibrator 123 in response to the start pulse enables the AND gate 125, permitting the regulation output on multivibrator 122 to control the switching control logic circuit 108 and hence regulate the output of the converter circuit.

The converter circuit includes a signal adjustment or soft-start arrangement with a fast slew characteristic. The soft-start arrangement includes a ramp pulse generator 118 to generate a ramp pulse. This ramp pulse is synchronized by the clock 109 which applies a synchronizing pulse thereto, via lead 138. The ramp pulse generator 118 generates a very slow internal ramp voltage having a long time period as compared to the period of each cycle. The slow internal ramp voltage is compared with a sawtooth wave voltage signal generated during each cycle of operation. The result of the comparison is a ramp pulse whose time delay relative to the synchronizing pulse increases during each successive cycle of operation.

The fast slew control circuit 117 controls the slope of the slow interval ramp voltage generated in the ramp generator 118. The fast slew control circuit 117 includes a sequence detector to compare the relative sequence of the synchronizing pulse applied to it via lead 139, the regulation modulated pulse width applied to it via lead 146, the start pulse applied to it via lead 147, and the ramp pulse applied to it via lead 129. When the ramp pulse occurs before the start pulse, or after the regulation pulse, the fast slew control 117 increases the slope of the internal ramp voltage generated by the ramp pulse generator 118 so that the ramp pulse moves quickly into the active region. The output of the AND gate 125, at which the final width modulated regulation pulse occurs, is coupled, via lead 145, to the switching control 108 which controls power flow from power source 101 to inverter 102 and hence controls the converter output signal.

Figure 2:
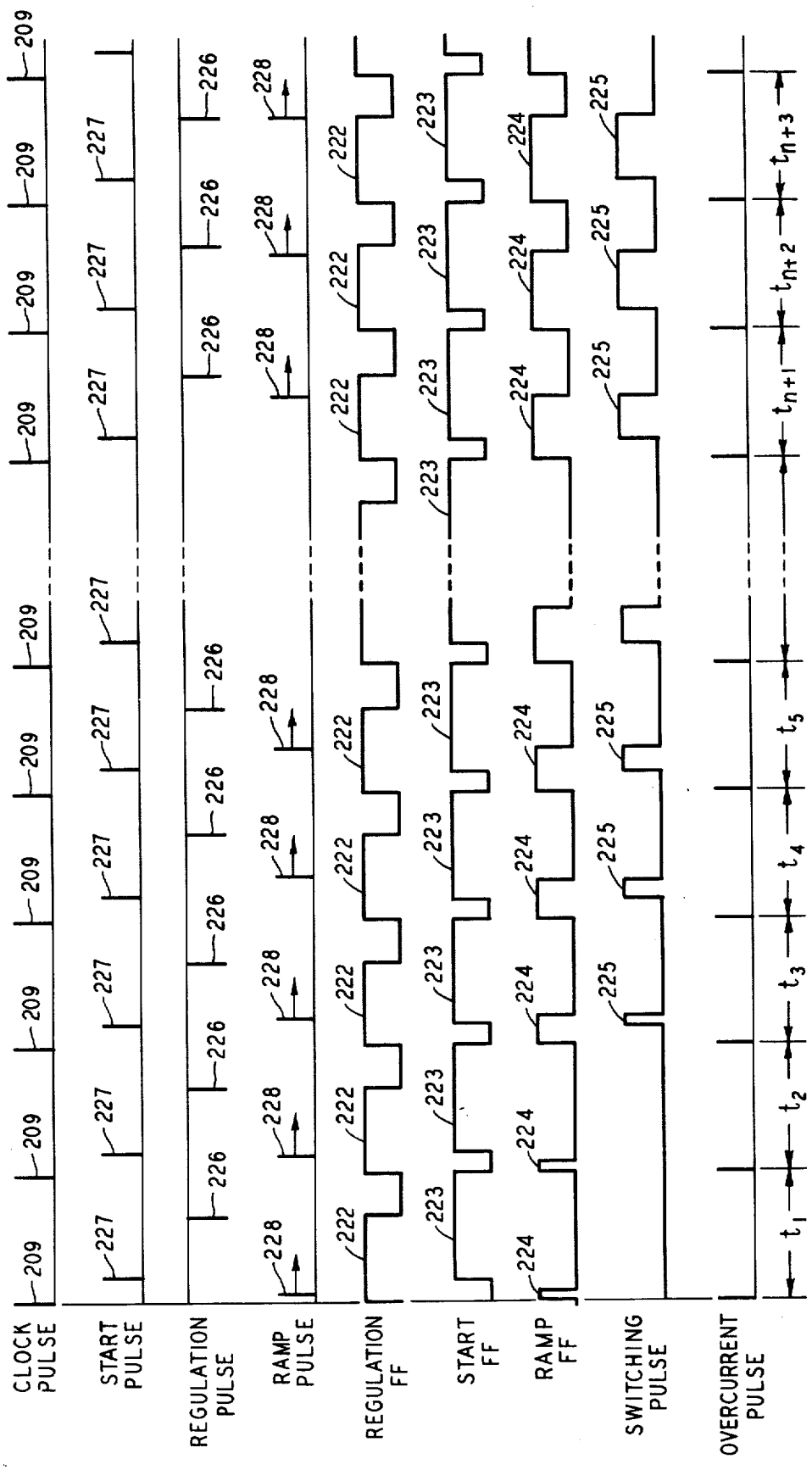
FIG. 2 shows voltage waveforms to illustrate the operation of the converter in response to the fast slewing circuit.

The operation of the converter circuit may be best understood by referring to the voltage waveforms shown in FIG. 2. The clock 109 generates a continuous sequence of synchronizing pulses shown by the pulses 209 in FIG. 2. These synchronizing pulses are used to set the multivibrators 121, 122, and 124 and reset the multivibrator 123. The synchronizing pulses are also applied, via lead 133, to a delay circuit 127 which delays it for a short period of time producing the starting pulse shown by the pulses 227 in FIG. 2. As is apparent from the foregoing, the clock sets the multivibrators 121, 122, and 124, producing high level outputs at each of these multivibrators. The output of the multivibrator 121 remains continuously high except in the occurrence of an overcurrent as described below. The output of the multivibrator 122 is a regulation pulse shown by the pulse waveforms 222. The output of the multivibrator 124 is a ramp modulated pulse shown by the pulse waveforms 224 which are terminated by the ramp pulses described below. The output of the multivibrator 123 is initially a low level signal. At the end of the initial dead time delay the start pulse output of the delay circuit 127 sets the multivibrator 123, producing the high output signal shown by the pulse waveform 223 which is utilized to enable the AND gate 125. The clock synchronizing pulse 209 is utilized to initiate the timing action of the pulse position modulator 111. The pulse position modulator 111 generates a time delayed regulation pulse 226 whose time position determines the trailing edge of the regulation pulse waveform 222. The leading and trailing edges of the switching pulse waveform 225 is, during normal steady state regulatory periods, determined by the start pulse 227 and the regulation pulse 226, respectively.

When the converter is initially being turned on a ramp pulse 228 is generated by the ramp pulse generator 118. The ramp pulse initially has a shorter time delay with respect to the synchronizing pulse than does the regulation pulse. Hence, it initially has precedence over the regulation pulse in controlling the pulse width of the switching signal waveform 225. The width of the switching waveform 225 is increased gradually until the regulated output of the converter is attained. The time delay of the ramp pulse 228 relative to the clock or synchronizing pulse 209 increases with each successive cycle. The slope of the internal ramp voltage and hence the increase of the time delay of the ramp pulse 228 is greatest when it occurs before the start pulse 227. The rate of this increase is less after the start pulse 227. This rate of increase is controlled by the fast slew control 117 which compares the relative sequence of the clock pulse 209, the start pulse 227, and the regulating pulse waveform 222 applied to it via leads 139, 147, and 146, respectively.

As is apparent from the foregoing, the ramp pulse during its initial starting time resets the multivibrator 124 quickly and the output of multivibrator 124 disables the AND gate 125 before the starting signal output of multivibrator 123 is applied thereto. As is apparent from an examination of the voltage waveforms in FIG. 2, the first two cycles designated by time periods $T_1$ and $T_2$ show the ramp control signal output of multivibrator 124 terminating before the output start signal 223 of multivibrator 123 is initiated. During the time period $T_3$ the output signal 224 of the multivibrator 124 is of sufficient duration that it overlaps with the output signal 223 of the multivibrator 123 and the AND gate 125 is enabled to transmit a portion of the output signal 222 of multivibrator 122. This output switching signal of AND gate 125 is shown by waveform 225. As the time delay of the ramp pulse 228 increases, the switching signal output of AND gate 225 increases in duration and, as can be seen, by the time the time period $T_{n+3}$ is reached, the output of AND gate 125 is at its full value and controls the switching control logic 108 so that the regulated output of the converter can be obtained.

The overcurrent protection circuit as described above, in response to an overcurrent, generates very high frequency pulses. Some of these pulses occur before the start pulse 227 in every cycle and are applied to quickly reset the multivibrator 121. Hence, the AND gate 125 is disabled before the occurrence of the start pulse and the switching control 108 output is inhibited for the duration of the overcurrent condition.

Figure 3:
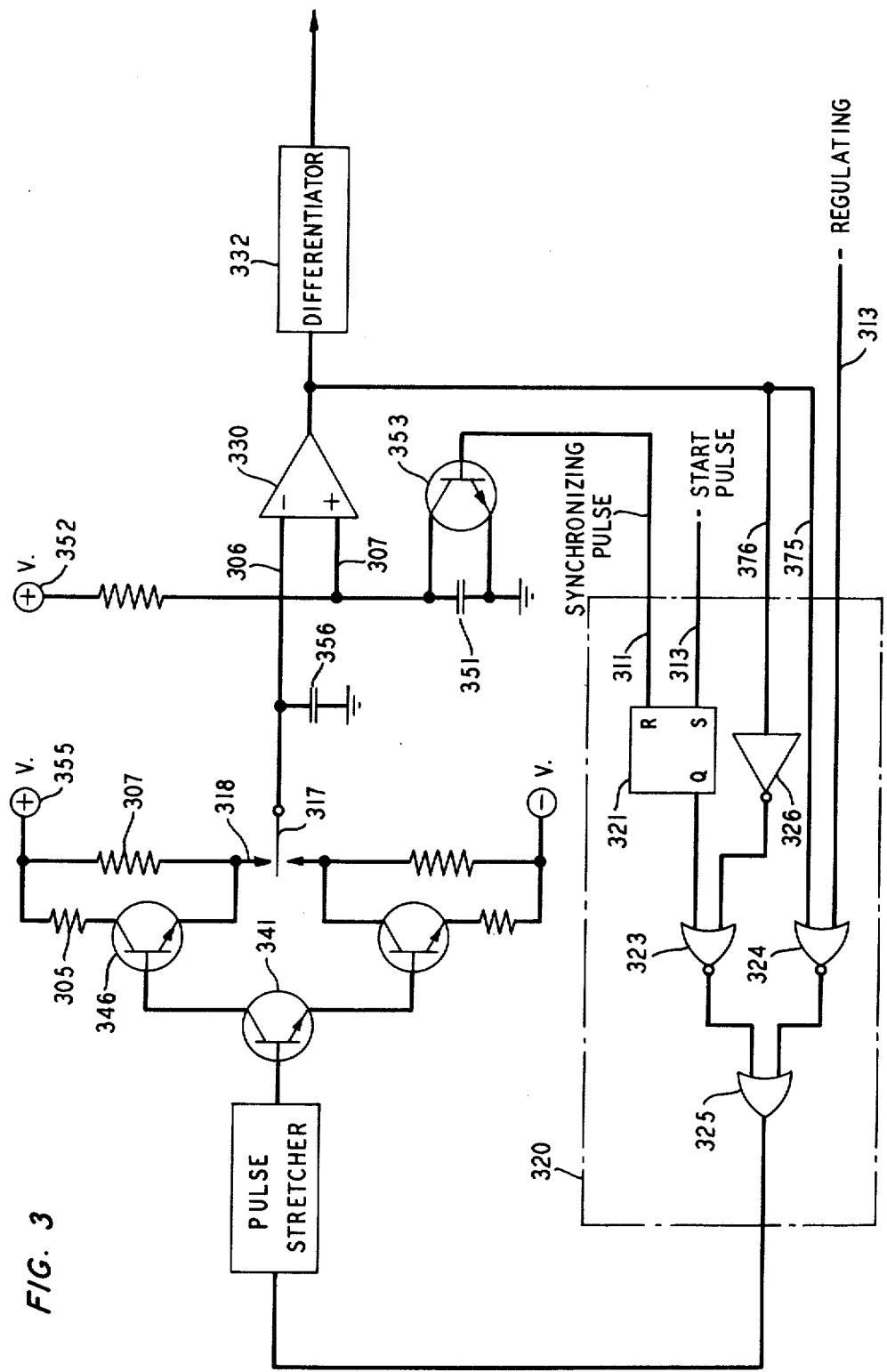
FIG. 3 is a combination block and schematic diagrammatic illustration of the fast slew control circuit.

A starting signal adjustment or soft-start circuit for slowly ramping up and down the converter output and including automatic fast slewing to rapidly move into the active control region is shown in FIG. 3. Voltage waveforms are shown in FIG. 4 and are used herein to illustrate the operation of the soft-start circuit. As described above, the signal adjustment or soft-start circuit is desirable in systems where the power supply must be turned up or turned down very slowly. The circuit in FIG. 2 accomplishes this by utilizing a ramp timing pulse to slowly increase or decrease the width of the regulating control pulse between the limits of zero and the equilibrium position pulse width determined by the feedback regulator at the completion of the power turn-on. The ramp pulse varies very slowly from the timing position of a start pulse up to the timing position of the regulation pulse during power turnup and similarly varies slowly from the regulation timing pulse to the start pulse during power turndown. The circuitry controlling the ramp voltage within the active control region is the comparator 330 and the differentiator 332. A long delay can occur while the slowly varying ramp pulse is traversing the region between the synchronizing pulse 411 and the start pulse 413 and approaching the active region between the start pulse 413 and the regulation pulse 412 during turnup of the regulation voltage. This delay is often increased because the slow ramp voltage starts at a lower magnitude than that of the sawtooth waveform. It is desired that the slowly varying ramp pulse slew rapidly into the active control region. The manner in which the ramp pulse is rapidly slewed into the active region may be readily attained by examining the controlling voltage waveforms in FIG. 4 and the circuit diagram in FIG. 3.

Ten successive time periods $T_1$ through $T_{10}$ are shown in FIG. 4. Each cycle $T_1$ through $T_{10}$ is initiated by a synchronizing pulse 411. The pulse position modulator of the regulation feedback circuit generates a regulation feedback pulse 412 whose time delay reserve to the synchronizing pulse 411 under normal operating conditions determines the pulse width of the control signal driving the converter switching devices. Since the converter operates with an initial dead time period, a ramp pulse with a time delay less than the dead time period does not function to inhibit the application of switching signals to the switching devices of the converter. The ramp pulse is shown by pulse 415 and, as is evident by examining the position of the ramp pulse during each successive time period $T_1$ through $T_{10}$, the time delay of the ramp pulse 415 relative to the synchronizing pulse 411 increases during each successive cycle of operation.

The ramp pulse 415 is generated by the series combination of comparator 330 and a differentiator 332. A sawtooth waveform voltage shown by waveform 407 in FIG. 4 is applied to the noninverting input of the comparator 330, via lead 307. The sawtooth waveform is generated by charging the capacitor 351 with the positive voltage V+ applied to the terminal 352. The synchronizing pulse 411 at the beginning of each cycle activates the transistor 353 to discharge the capacitor 351.

The slowly varying ramp voltages 405 and 406 are applied to the inverting input terminal 306. For the particular voltage shown here the ramp voltage is generated by charging the capacitor 356 in response to the voltage V+ applied to terminal 355. The charging path is completed via one of two conduction paths, either through the resistor 307 or through the resistor 305 and transistor 346 to the terminal 318, switch 317, and from thence to capacitor 356. The particular path through which this charging current flows controls the slope of the ramp voltage and is determined in response to the pulse sequence detector 320 whose operation is described below.

The sawtooth waveform 407 and the successive ramp voltages 405 and 406 are applied to the comparator 330. The output of comparator 330 is in a low state as long as the magnitude of the sawtooth waveform 407 exceeds the magnitude of the ramps 405 and 406. The output of the comparator 330 switches to a high state when the magnitude of the ramp voltages 405 and 406 exceeds the magnitude of the sawtooth waveform 407. The differentiator 332 generates the spike ramp pulse 415 in response to the transition in states of the output of the comparator 330.

The pulse sequence detector 320 determines the sequence of the ramp pulse 415 relative to the synchronizing pulse 411, the start pulse 413, and the regulating pulse 412. The pulse sequence detector 320 generates an output pulse signal which is applied to the pulse stretcher 335 and from thence to the ramp slope control transistor 341. If the ramp pulse occurs before the start pulse, such as is the case in the time periods $T_1$, $T_2$, $T_3$, and $T_4$ shown in FIG. 4, the pulse sequence detector 320 activates the pulse stretcher 335 which in turn activates the ramp slope control transistor 341. This ramp slope control transistor 341 in its conducting condition activates the transistor 346 and enables current to flow from terminal 355 through a relatively low impedance 305 to the charging capacitor 356. When the ramp pulse 415 and start pulse 413 are coincident as in time period $T_5$, the pulse sequence detector no longer produces an output signal and the ramp slope control transistor 346 is consequently biased nonconducting. The current then flows from terminal 355 through the relatively high impedance 307 and through terminal 318 and switch 317 to the capacitor 356. The slope of the ramp voltage 406 subsequent to this time is less than the slope of the ramp voltage 405. The ramp voltage 406 continues to increase in magnitude and the time delay of ramp pulse 415 relative to the synchronizing pulse 411 continues to increase until it is coincident with the regulation pulse 412. Subsequent to this point of coincidence of the ramp pulse 415 and the regulation pulse 412, the width modulated pulse driving the switching device is controlled by the occurrence of the regulation pulse 412 rather than the occurrence at the ramp pulse 415.

It is apparent from the foregoing description of the operation of the fast slew control circuit that should an overvoltage be turned down that transistor 351 would be activated to speed up the turndown until the active regulation region was reached.

The operation of the fast slew control shown in FIG. 3 is controlled by the pulse sequence detector 320 which selects the appropriate slope of the ramp voltage.

The pulse sequence detector comprises a bistable multivibrator 321 having its output connected to the NOR gate 323. The output of the comparator 330 is connected to the NOR gate 324, via lead 375, and to the polarity inverter 326 via lead 376. The output of the inverter 326 is connected to NOR gate 323. The output of multivibrator 122 of FIG. 1 is applied to NOR gate 324 via lead 313. The outputs of NOR gates 323 and 324 are connected to the OR gate 325 which in turn is connected to the pulse stretcher 335.

The synchronizing pulse 411 is applied to lead 311 to reset the bistable multivibrators 321. In the reset condition the multivibrator 321 has a low signal state output. This low signal state is applied to the NOR gate 323. The start pulse 413 is applied to lead 313 and sets the bistable multivibrator 321. The bistable multivibrator 321 in its set condition applies a high signal state output to the NOR gate 323. If the output of the comparator 330 switches from a low state to a high state before the occurrence of the start pulse on lead 313, it is transmitted by the NOR gate 323 to OR gate 325. The low to high transition of the comparator is coincident in time with the ramp pulse derived therefrom. If the output of the comparator 330 is low during the occurrence of the regulation waveform on lead 313, the pulse is transmitted by NOR gate 324 to OR gate 325. Pulses arriving at OR gate 325 are applied to the pulse stretcher 335 which in turn biases the ramp slope control transistor 341.

It is apparent from the foregoing description that should the ramp pulse 415 occur before the starting pulse 413 that the NOR gate 323 is enabled to transmit a signal to the pulse stretcher 335 and the ramp slope control transistor 341 is biased conducting. If the ramp pulse 415 occurs subsequent to the starting pulse 413 no pulse signal is transmitted to the pulse stretcher 335 and the ramp slope control transistor 341 is biased nonconducting. Similarly, if the ramp pulse 415 occurs subsequent to the regulation pulse such as in a turndown situation, the pulse sequencing detector generates a pulse. The pulse is applied to the pulse stretcher 335 which applies to a pulse to bias the ramp slope control transistor 341 conducting. This in turn biases the transistor 351 conducting, completing a charging path from terminal 352 at which negative voltage V− is applied, via terminal 319 and switch 317, to the capacitor 356.

The sequence detector 320 operates digitally and compares the relative sequence of the various feedback control pulses. This arrangement advantageously eliminates the need for analog voltage comparisons to activate the fast slewing control.

What is claimed is:

1. In a signal processing system, means to accept input signals, means to regulate said signals and output means, said means to regulate including means to generate feedback pulses and logic means responsive to said feedback pulses, means to inhibit the response of said logic means for a short time period at the beginning of each cycle, and signal adjustment means to control the rate of change of said output signal during turnon and turnoff operations, said signal adjustment means comprising means to generate a ramp pulse signal whose relative position changes in each successive cycle of operation, and means to control the rate of change of said relative position including means to increase the rate of change during said short time period.

2. A signal processing system as defined in claim 1 wherein, said means to generate a ramp pulse signal comprises a ramp voltage generator including first and second charging circuits and said means to control the rate of change comprises means to monitor the relative sequence of said feedback pulses and said ramp pulse signal, and means to select one of said first and second charging circuits in response to the means to monitor the relative sequence of said feedback pulses and said ramp pulse.

3. In a DC to DC converter having controlled switching devices, regulating circuit means to control the switching times of said switching devices, said regulating circuit means including means to generate regulation pulses to control the duty cycle of said switching devices, and means to inhibit switching in said switching devices during an initial dead time period during each cycle, and signal adjustment circuitry to initially limit the pulse width of the switching pulse controlling the duty cycle of the switching devices of said converter and slowly increase it to the regulated value, including a ramp generator to generate a ramp signal to control the action of said signal adjustment circuitry whereby the improvement comprises, means to increase the ramp slope during the initial dead time period and subsequent to the regulation pulse, including first and second charging circuits and gating means to selectively couple one of said first and second charging circuits to the timing circuit of said ramp generator during turnup and turndown, respectively.

4. A DC to DC converter as defined in claim 3 wherein said regulator circuit means responds only to the first arriving feedback pulse, current protection means including means to monitor an overcurrent in said converter, high frequency pulse signal generation means coupled to said means to monitor and responsive to an overcurrent, the period of said high frequency pulse signal being much less than said dead time period, and means responsive to said high frequency pulse signal to limit the switching pulse width and the corresponding switching current level of said converter.

5. A signal adjustment system to control turnup and turndown in a digitally controlled signal processing system including signal control means responsive to pulse signals, regulation means to generate regulation pulse signals to regulate, synchronizing means to generate synchronizing pulse signals to initiate each cycle of operation, starting means to generate starting pulse signals to initiate starting of regulatory control action, subsequent to said synchronizing pulses, said signal control means responsive to the first arriving regulation pulse to establish the regulation level, and said signal adjustment means comprising, ramp pulse generation means to generate a ramp pulse whose relative distance from said synchronizing pulse increases during each succeeding cycle of operation, and fast slew control means to control the rate at which said relative distance changes during each successive cycle including sequence detection means to compare the sequence of occurrence of said synchronizing pulse, said start pulse, said ramp pulse, and said regulator pulse, and rate control means responsive to said sequence detection means to alter the rate at said relative distance changes wherein said rate is greater when said ramp pulse is outside the time duration established by said start pulse and said regulation pulse.

6. A signal adjustment system as defined in claim 5 further including, means to respond to an overcurrent condition in said signal processing system comprising, means to monitor a system current, a reference signal, means to compare the system current to said reference signal, protection pulse generator means responsive to said means to compare and operating at a frequency to assure that at least a protection pulse output will occur between said synchronizing pulse and said starting pulse, and said signal control means responsive to the protection pulse to inhibit the signal output of said signal processing system.

* * * * *